(12) United States Patent
Tagami

(10) Patent No.: US 8,327,751 B2
(45) Date of Patent: Dec. 11, 2012

(54) WABBLE PLATE TYPE VARIABLE DISPLACEMENT COMPRESSOR

(75) Inventor: Shinji Tagami, Isesaki (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 663 days.

(21) Appl. No.: 12/517,539

(22) PCT Filed: Nov. 13, 2007

(86) PCT No.: PCT/JP2007/071960
§ 371 (c)(1),
(2), (4) Date: Dec. 17, 2009

(87) PCT Pub. No.: WO2008/069001
PCT Pub. Date: Jun. 12, 2008

(65) Prior Publication Data
US 2010/0092312 A1    Apr. 15, 2010

(30) Foreign Application Priority Data
Dec. 5, 2006  (JP) ................................. 2006-327988

(51) Int. Cl.
*F01B 3/02*    (2006.01)
(52) U.S. Cl. ................. 92/12.2; 92/71; 91/505
(58) Field of Classification Search .................. 92/12.2, 92/57, 71; 91/499, 504, 505; 417/269
See application file for complete search history.

(56) References Cited

U.S. PATENT DOCUMENTS

| 5,112,197 A | 5/1992 | Swain et al. |
| 5,129,752 A | 7/1992 | Ebbing et al. |
| 5,509,346 A | 4/1996 | Kumpf |

FOREIGN PATENT DOCUMENTS

| JP | H05-099137 A | 4/1993 |
| JP | 2006-200405 A | 8/2006 |

OTHER PUBLICATIONS

European Patent Office, extended European Search Report for European Patent Application No. 07831690.8 (counterpart European patent application), dated Jul. 3, 2012.

*Primary Examiner* — Michael Leslie
(74) *Attorney, Agent, or Firm* — Baker Botts L.L.P.

(57) ABSTRACT

A wabble plate type variable displacement compressor comprises a rotation preventing mechanism of the wabble plate which includes (a) an inner ring provided movably in the axial direction although rotation is prevented, supporting a main shaft at the inner diameter portion to rotate relatively and to move relatively in the axial direction and having a plurality of guide grooves for guiding a plurality of balls provided for power transmission, (b) a sleeve functioning as a wabble central member of wabble movement of the wabble plate, provided on the main shaft to rotate relatively thereto and to move in the axial direction and engaging with the inner ring movably in the axial direction, (c) an outer ring having a plurality of guide grooves for guiding balls at positions opposing respective guide grooves in the inner ring, supported on the sleeve wabblingly, supporting the wabble plate fixedly on the outer circumference and supporting a swash plate rotatably via a bearing, and (d) a plurality of balls held by the guide grooves formed in the inner ring and the outer ring and being compressed between the guide grooves to transmit power. While play in a uniform motion joint provided as the wabble plate rotation preventing mechanism in the radial direction and the rotational direction is suppressed, uniform and continuous contact of the plurality of balls operating for power transmission can be realized, and a compact, easy-to-machine and inexpensive wabble plate type variable displacement compressor exhibiting good durability and silent performance can be provided.

9 Claims, 5 Drawing Sheets

(A)

(B)

(A)

(B)

WABBLE PLATE TYPE VARIABLE DISPLACEMENT COMPRESSOR

CROSS-REFERENCE TO RELATED APPLICATIONS

This application is the National Stage of International Patent Application No. PCT/JP2007/071960, filed Nov. 13, 2007, which claims the benefit of Japanese Patent Application No. 2006-327988, filed Dec. 5, 2006, the disclosures of which are incorporated herein by reference in their entirety.

TECHNICAL FIELD OF THE INVENTION

The present invention relates to a wabble plate type variable displacement compressor, and specifically, to a wabble plate type variable displacement compressor which incorporates therein a new rotation preventing mechanism for the wabble plate.

BACKGROUND ART OF THE INVENTION

A wabble plate type variable displacement compressor is known wherein a rotational movement of a swash plate rotated together with a rotational main shaft and supported changeably in angle relative to the main shaft is converted into a wabble movement of a wabble plate, and by transmitting the wabble movement to a piston connected to the wabble plate, the piston is reciprocated. In this wabble plate type variable displacement compressor, because it is necessary to prevent the rotation of the wabble plate connected to the piston, a rotation preventing mechanism of the wabble plate is incorporated. With respect to the rotation preventing mechanism of the wabble plate, various improvements for making the compressor small, improving the durability and the silent performance, facilitating processing, cost down, etc., have been investigated.

For example, in Patent documents 1, 3 and 4, a structure provided with a Birfield type uniform motion joint as a wobble plate rotation preventing mechanism is disclosed. In this structure, since wabble parts and a swash plate are supported by an outer ring of a Birfield type uniform motion joint provided as a wobble plate rotation preventing mechanism, and ultimately supported by a main shaft via a cage of an internal part of the uniform motion joint (a cage for regulating positions of a plurality of balls for performing power transmission), and further, via an inner ring of the uniform motion joint, the number of interposed parts increases and the accumulated play becomes great, and therefore, there is a problem insufficient in vibration, noise and durability.

Further, although the Birfield type uniform motion joint disclosed in Patent documents 1, 3 and 4 theoretically has a structure performing a rotational power transmission between inner and outer rings by a plurality of balls, actually it is a multiple restriction structure, and it is difficult to achieve uniform and continuous contact of the plurality of balls, and therefore, a contact pressure of specified balls may locally increase. Further, because the rotational power transmission between inner and outer rings is performed in the shear direction of balls by ball guide grooves formed on each of inner and outer rings on both sides of a cage, the contact surface between the balls and the guide grooves may have a large inclination relative to the power transmission direction. By this, when a predetermined power is transmitted, the contact load generated as a vertical reaction force becomes high. Therefore, in order to ensure a sufficient transmission ability, it is necessary to employ a sufficiently large ball size (ball diameter), and from these reasons, it is difficult to make the structure further small-sized, and it is difficult to apply it to a small displacement compressor.

Further, since the support for the rotational main shaft of the compressor in the internal mechanism described in Patent documents 2, 3 and 4 is provided on one side relative to the main mechanism portion (a cantilever supporting is employed), whirling of the main shaft becomes great, and it is disadvantageous on durability, vibration and noise.

Further, in the compression mechanism disclosed in Patent documents 3 and 4, since the inner ring of the uniform motion joint is supported slidably in the axial direction at a condition being prevented with rotation, it is necessary to make the main shaft thick in order to ensure the rigidity of the main shaft provided to the housing to be sufficiently great, and it may cause increase of the weight of the main shaft and the weight of the product.

Further, in the uniform motion joint mechanism disclosed in Patent documents 3 and 4, machining of grooves for regulating the positions of a plurality of balls operating for power transmission is complicated, and the mechanism may be disadvantageous on cost.

Furthermore, in the compression mechanism disclosed in Patent document 2, since there is no support in the radial direction due to the main shaft in the main mechanism portion and play in the wabble portion in the radial direction tends to become great, by this play, problems on durability, vibration and noise may occur.

Patent document 1: U.S. Pat. No. 5,112,197
Patent document 2: U.S. Pat. No. 5,509,346
Patent document 3: U.S. Pat. No. 5,129,752
Patent document 4: JP-A-2006-200405

DISCLOSURE OF THE INVENTION

Problems to be Solved by the Invention

Accordingly, paying attention to the problems in the above-described conventional technologies, an object of the present invention is to provide a wabble plate type variable displacement compressor using a uniform motion joint small-sized, good in durability and silent performance, easy-to-machine and inexpensive, achieved by realizing uniform and continuous contact of a plurality of balls operating for power transmission while suppressing play in the radial direction and rotational direction of the inside of the uniform motion joint provided as a wabble plate rotation preventing mechanism.

Means for Solving the Problems

To achieve the above-described object, a wabble plate type variable displacement compressor according to the present invention has a wabble plate which is connected to a piston inserted reciprocally into a cylinder bore, in which a rotational movement of a swash plate rotated together with a rotational main shaft and supported changeably in angle relative to the main shaft is converted into a wabble movement of the wabble plate, and which transmits the wabble movement to the piston to reciprocate the piston, and is characterized in that a rotation preventing mechanism of the wabble plate comprises (a) an inner ring provided in a housing movably in an axial direction although rotation is prevented, supporting the rotational main shaft via a bearing at an inner diameter portion to rotate relatively and to move relatively in an axial direction and having a plurality of guide grooves for guiding a plurality of balls provided for power transmission, (b) a sleeve functioning as a wabble central member of the wabble movement of the wabble plate, provided on the rotational main shaft to rotate relatively thereto and to move in an axial direction and engaged with the inner ring movably in an axial direction together with the inner ring, (c) an outer ring having a plurality of guide grooves for guiding the balls at positions opposing respective guide grooves of the inner ring, supported on the sleeve wabblingly, supporting the wabble plate fixedly on an outer circumference and supporting the swash plate rotatably via a bearing, and (d) a plurality of balls held by the guide grooves formed in the inner ring and the outer ring at a condition of opposing each other and performing power transmission by being compressed between the guide grooves.

In the rotation preventing mechanism of the wabble plate thus constructed, by the structure where the outer ring of the rotation preventing mechanism is supported wabblingly by the sleeve and the sleeve is supported rotatably and movably in the axial direction relative to the rotational main shaft, it becomes possible to make play in the radial direction between the rotational main shaft and the whole of the wabble mechanism portion small, and increase of reliability and reduction of vibration and noise may become possible. Further, the inner ring is supported in the housing movably in the axial direction and prevented with rotation, and by the bearing provided in the inner diameter portion of this inner ring, the rotational main shaft, for example, the rear end portion of the rotational main shaft, is supported. Therefore, the rotational main shaft is rotatably supported at both sides of the compression main mechanism portion (that is, inboard type supporting), a sufficiently high rigidity can be easily ensured, the whirling of the main shaft may be suppressed small, and therefore, it becomes possible to make the diameter of the main shaft small, improve the reliability and reduce vibration and noise. Further, because the whirling of the main shaft is suppressed, the deflection of the swash plate rotated together with the main shaft may be suppressed small, and the rotational balance of the whole of the rotational portion may be improved. Further, by optimizing the formation of the guide grooves formed on the inner ring and the outer ring which oppose each other, uniform and continuous contact of the balls held between the guide grooves becomes possible, and therefore, it becomes possible to improve the reliability and reduce vibration and noise. Furthermore, the guide grooves of balls may be formed so that balls can roll between a pair of guide grooves separated from each other accompanying with the movement of the intersection of both guide grooves, complicated shapes are not required for the guide grooves themselves, and therefore, the machining therefore is facilitated and becomes advantageous on cost. In such a structure according to the present invention, basically, the plurality of balls operating for power transmission perform power transmission at a condition where they are nipped and supported between guide grooves facing to each other in the compression direction. By this, an actual contact area can be ensured sufficiently large, it becomes possible to reduce the contact surface pressure, and it becomes advantageous on reliability. Further, because the contact surface pressure can be reduced, it becomes possible to make the diameter of balls small and it becomes also possible to make the whole of the rotation preventing mechanism small-sized.

In this wabble plate type variable displacement compressor according to the present invention, it is possible to employ a structure wherein the outer ring and the wabble plate in the above-described wabble plate rotation preventing mechanism are formed integrally. By this integration, it becomes possible to further decrease the number of parts, and it becomes advantageous also in cost for manufacture and assembly.

Further, a structure may be employed wherein the guide grooves opposing each other of the inner ring and the outer ring of the above-described rotation preventing mechanism are formed at a relative angle of 30 to 60 degrees relative to a center axis of the rotational main shaft, and guide grooves opposing each other for forming a single ball guide are disposed so as to be symmetric relative to a plane perpendicular to the main shaft and passing through a wabble center of the wabble plate at a condition where a relative angle between an axis of the inner ring and an axis of the outer ring is zero. By the structure where the guide grooves opposing each other are disposed at a crossed axes angle within a predetermined range and both guide grooves formed in the directions crossed with each other are disposed symmetrically relative to the plane passing through the wabble center of the wabble plate, it becomes possible that the balls held between the guide grooves are brought into contact with both guide grooves at a uniform and continuous condition, the vibration and noise at this portion may be greatly reduced, and the reliability may be greatly improved.

Further, in this constitution, a structure may be employed wherein two ball guides adjacent to each other among a plurality of ball guides of the above-described rotation preventing mechanism are referred to be a pair of ball guides, and the pair of ball guides are disposed in parallel to each other. By such a structure, because the play in the rotational direction in the rotation preventing mechanism portion is schematically decided by a relationship between the distance between the bottoms of the pair of guide grooves provided on the inner and outer rings and the diameter of the balls, setting and management of an actual clearance are facilitated, and it becomes possible to suppress the play to be small by setting a proper clearance.

In this constitution, a structure may be employed wherein the pair of ball guides disposed in parallel to each other are disposed symmetrically relative to a plane including a center axis of the rotational main shaft, and a structure also may be employed wherein a guide groove forming one ball guide of the pair of ball guides, which are disposed in parallel to each other, is disposed so that its axis is positioned on a plane including a center axis of the rotational main shaft. In the former structure, a rotation preventing mechanism, in which a rotational direction may not be selected, can be formed, and it becomes possible to reduce the contact load of the balls, and in the latter structure, it becomes possible to further reduce the contact load by setting the power transmission direction at a specified direction.

Further, in the above-described rotation preventing mechanism, a structure may be employed wherein two ball guides disposed on both sides of the rotational main shaft approximately symmetrically relative to the rotational main shaft among the plurality of ball guides are referred to be a pair of ball guides, and the pair of ball guides are disposed in parallel to each other. By this structure, because the play in the rotational direction in the rotation preventing mechanism portion is schematically decided by a relationship between the distance between the bottoms of the pair of guide grooves provided on the inner and outer rings and the diameter of the balls, it becomes possible to set and manage actual clearances in both ball guides simultaneously at desirable clearances, by disposing two ball guides symmetrically disposed in parallel to each other. As a result, the setting and management of the clearances are facilitated, and it becomes possible to suppress the play to be small.

In this structure, it is preferred that the above-described pair of ball guides, which are disposed in parallel to each other, are disposed so that axes of guide grooves forming the pair of ball guides are positioned on a plane including a center axis of the rotational main shaft. By disposing the pair of ball guides on the plane including the center axis of the rotational main shaft, it becomes possible to minimize the ball contact load without selecting the power transmission direction.

Effect According to the Invention

Thus, in the wabble plate type variable displacement compressor according to the present invention, as compared with the wabble plate rotation preventing mechanism using the conventional uniform motion joint, uniform and continuous contact of a plurality of balls operating for power transmission can be achieved, a rotation preventing mechanism small-sized, excellent in durability and silent performance, good in rotational balance, easy in machining and inexpensive can be realized, and a wabble plate type variable displacement compressor, having an excellent performance which has not been achieved by the conventional technologies, can be provided.

BRIEF EXPLANATION OF THE DRAWINGS

FIG. 4(A) is a partial, vertical sectional view thereof, and FIG. 4(B) is a partial elevational view thereof.

EXPLANATION OF SYMBOLS

Figure 1:
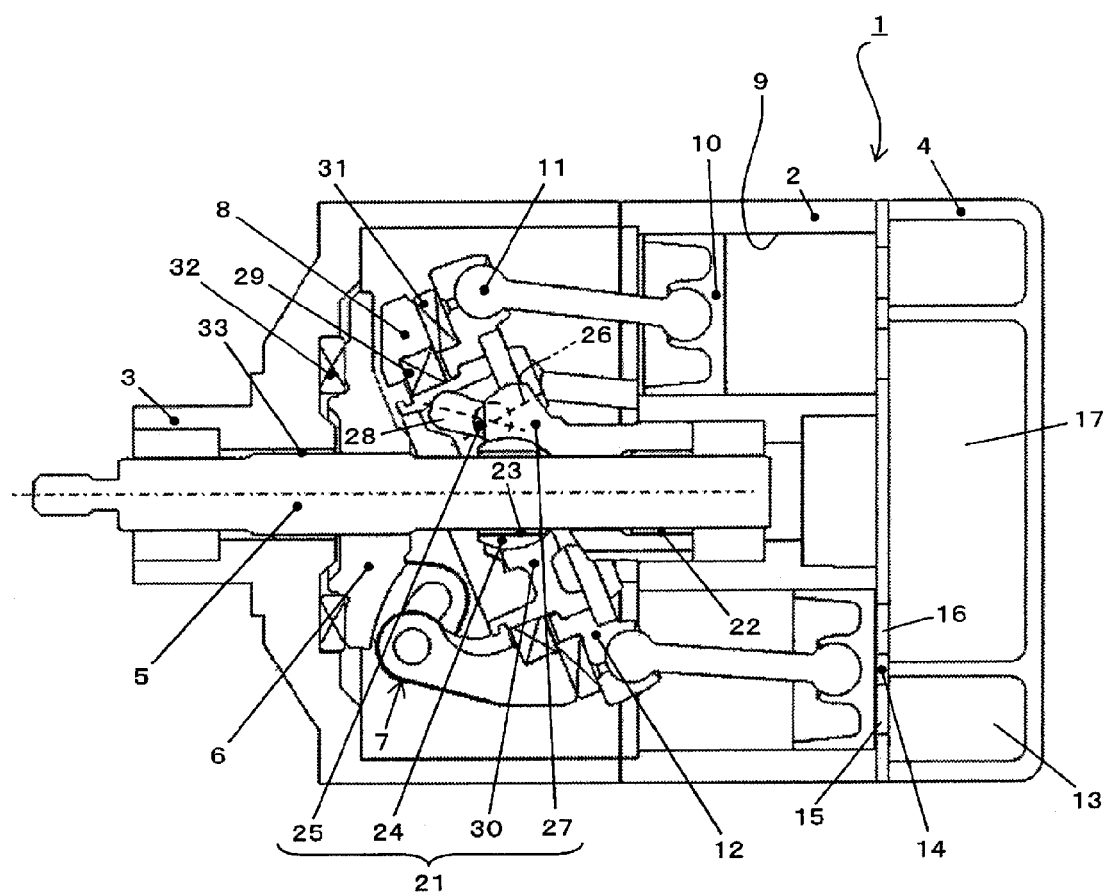
FIG. 1 is a vertical sectional view of a wabble plate type variable displacement compressor according to an embodiment of the present invention.

1: wabble plate type variable displacement compressor
2: housing
3: front housing
4: rear housing
5: rotational main shaft
5a: center axis
6: rotor
7: hinge mechanism
8: swash plate
9: cylinder bore
10: piston
11: connecting rod
12 wabble plate
13: suction chamber
14: valve plate
15: suction hole
16: discharge hole
17: discharge chamber
21: rotation preventing mechanism of wabble plate
22, 23, 29, 33: bearing (radial bearing)
24: sleeve
25: ball
26: guide groove of inner ring
27: inner ring
28: guide groove of outer ring
30: outer ring
31, 32: thrust bearing
41: ball guide
42, 43: axis of guide groove
44: plane passing through wabble center
45: pair of ball guides
46: axes of guide grooves formed on inner and outer rings
51: plane passing through center axis of rotational main shaft
52: axes of guide grooves formed on inner and outer rings
61: pair of ball guides
62: power transmission direction of outer ring
63: pair of ball guides
64: axis of guide groove
65: plane passing through center axis of rotational main shaft
66: power transmission direction of inner ring
71: pair of ball guides
72: axis of guide groove
81: pair of ball guides
82: axis of guide groove
83: plane passing through center axis of rotational main shaft
84: wabble plate integrated with outer ring

THE BEST MODE FOR CARRYING OUT THE INVENTION

Hereinafter, desirable embodiments of the present invention will be explained referring to figures.

Figure 2:
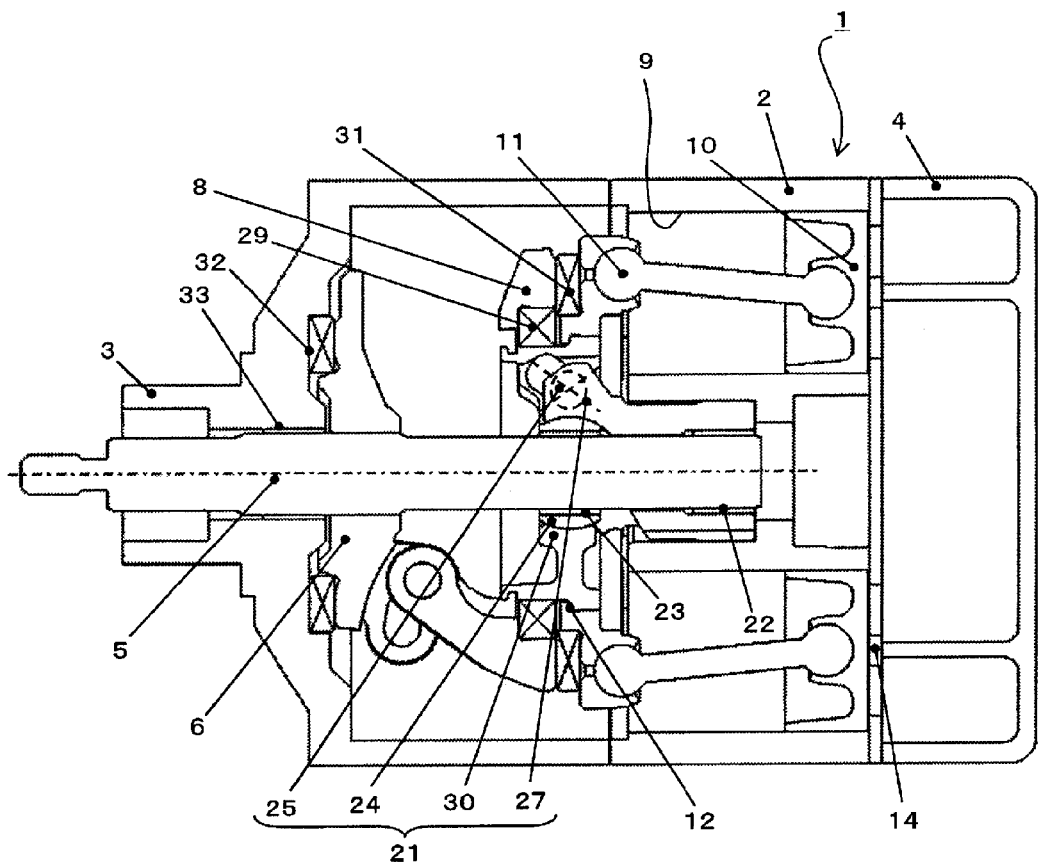
FIG. 2 is a vertical sectional view of the wabble plate type variable displacement compressor depicted in FIG. 1, showing an operational condition different from that depicted in FIG. 1.
Figure 3:
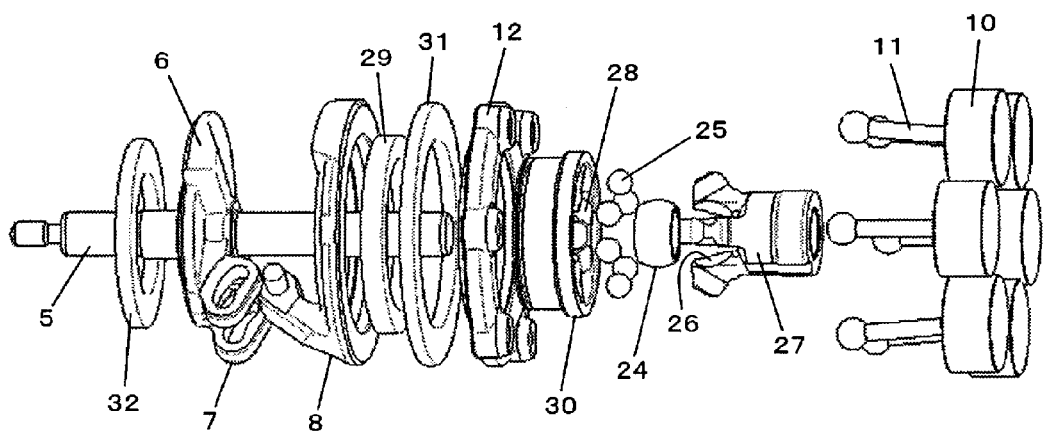
FIG. 3 is an exploded perspective view of a main portion including a wabble plate rotation preventing mechanism of the wabble plate type variable displacement compressor depicted in FIG. 1.

FIG. 1 shows a wabble plate type variable displacement compressor according to an embodiment of the present invention, and shows its entire structure in the operation state at the condition of the displacement achieving its maximum discharge. FIG. 2 shows the operation state of the wabble plate type variable displacement compressor depicted in FIG. 1 at the condition of the displacement achieving its minimum discharge. FIG. 3 shows a main portion including a wabble plate rotation preventing mechanism in the wabble plate type variable displacement compressor depicted in FIG. 1 as an exploded perspective view.

In FIGS. 1 and 2, a wabble plate type variable displacement compressor 1 has a housing 2 disposed at the central portion, a front housing 3 and a rear housing 4 disposed on both sides of the housing 1 as its housings, and a rotational main shaft 5 inputted with a rotational drive power from outside is provided over the range from the portion of housing 2 up to the position extending through front housing 3. A rotor 6 is fixed to rotational main shaft 5 so as to be rotated integrally with main shaft 5, and a swash plate 8 is connected to rotor 6 via a hinge mechanism 7, changeably in angle and rotatably together with rotational main shaft 5. Piston 10 is reciprocally inserted into each cylinder bore 9, and piston 10 is connected to wabble plate 12 via connecting rod 11. The rotational movement of swash plate 8 is converted into the wabble movement of wabble plate 12, the wabble movement is transmitted to piston 10 via connecting rod 11, and piston 10 is reciprocated. Fluid to be compressed (for example, refrigerant) is sucked from suction chamber 13 formed in rear housing 4 into cylinder bore 9 through suction hole 15 formed on valve plate 14 (a suction valve is omitted in the figure) accompanying with the reciprocating movement of piston 10, and after the sucked fluid is compressed, the compressed fluid is discharged into discharge chamber 17 through discharge hole 16 (a discharge valve is omitted in the figure), and therefrom, sent to an external circuit.

It is necessary that the above-described wabble plate 12 performs a wabble movement at a condition where its rotation is prevented. Hereinafter, the remaining portions of compressor 1 will be explained mainly with respect to the rotation preventing mechanism of this wabble plate 12, referring to FIGS. 1 to 3.

Rotation preventing mechanism 21 of wabble plate 12 is formed from a mechanism comprising (a) an inner ring 27 provided in housing 2 movably in the axial direction although its rotation is prevented, supporting rotational main shaft 5 via a bearing 22 (radial bearing) at its inner diameter portion to rotate relatively and to move relatively in the axial direction and having a plurality of guide grooves 26 for guiding a plurality of balls 25 provided for power transmission, (b) a sleeve 24 functioning as a wabble central member of the wabble movement of wabble plate 12, provided on rotational main shaft 5 to rotate relatively thereto and to move in the axial direction and engaged with inner ring 27 movably in the axial direction together with inner ring 27, (c) an outer ring 30 having a plurality of guide grooves 28 for guiding balls 25 at positions opposing respective guide grooves 26 of inner ring 27, supported on sleeve 24 wabblingly, supporting wabble plate 12 fixedly on its outer circumference and supporting swash plate 8 rotatably via a bearing 29 (radial bearing), and (d) a plurality of balls 25 held by guide grooves 26, 28 formed in inner ring 27 and outer ring 30 at a condition of opposing each other and performing power transmission by being compressed between guide grooves 26, 28. Thrust bearings 31, 32 are interposed between wabble plate 12 and swash plate 8 and between rotor 6 and front housing 3, respectively. Further, although inner ring 27 is supported in housing 9 movably in the axial direction, its rotation is prevented. As means for preventing the rotation, a general rotation regulating means such as a key or a spline may be used (not depicted). Furthermore, although the rear end of rotational main shaft 5 is supported by bearing 22 provided on the inner diameter portion of inner ring 27, because rotational main shaft 5 is supported also at the side of front housing 3 through the compression main mechanism portion rotatably via bearing 33 (radial bearing), it is radially supported on both sides (inboard supporting).

In rotation preventing mechanism 21 of wabble plate 12 constructed as described above, outer ring 30 is wabblingly supported bay sleeve 24 through the spherical surface contact, and sleeve is supported by rotational main shaft 5 rotatably and movably in the axial direction, and by this structure, it is possible to make play in the radial direction between rotational main shaft 5 and the whole of the wabble mechanism portion small, thereby improving the reliability and reducing vibration and noise.

Further, in the above-described embodiment, since rotational main shaft 5 is supported in the condition of inboard supporting on both sides of the compression main mechanism portion by bearing 22 provided in the inner diameter portion of inner ring 27 and bearing 33 provided on front housing 3 side, a sufficiently high rigidity can be ensured even if the diameter of main shaft 5 is relatively small, the whirling of main shaft 5 can also be suppressed, making small-sized can be easily achieved, and improvement of reliability and reduction of vibration and noise may be possible. Further, as the result of suppressing the whirling of rotational main shaft 5, the whole of the rotational portion rotated together with rotational main shaft 5 can be suppressed to be small, and therefore, the rotational balance of the whole of the rotated portion becomes remarkably good. Where, in the above-described structure, it is possible to extend rotational main shaft 5 rearward and to replace it for a structure being supported directly by housing via a bearing.

Moreover, in the above-described embodiment, by the engagement of the spherical surface formed in the inner diameter side of inner ring 27 with the spherical surface formed in the outer diameter side of sleeve 24, a mutual supporting between both members is performed. By adjusting a clearance in this supporting portion, it is possible to absorb a relative whirling of the inner and outer rings caused by the dispersion of the positions of the guide grooves for a plurality of balls operating for power transmission, whereby the uniform and continuous contact of balls 25 is further improved, and it is more advantageous with respect to reliability, vibration and noise.

Where, although outer ring 30 and wabble plate 12 are formed as separate members and they are fixed to each other in the above-described embodiment, it is possible to form them integrally. By such an integration, the number of parts may be further decreased, and the assembly may be facilitated.

Figure 4:
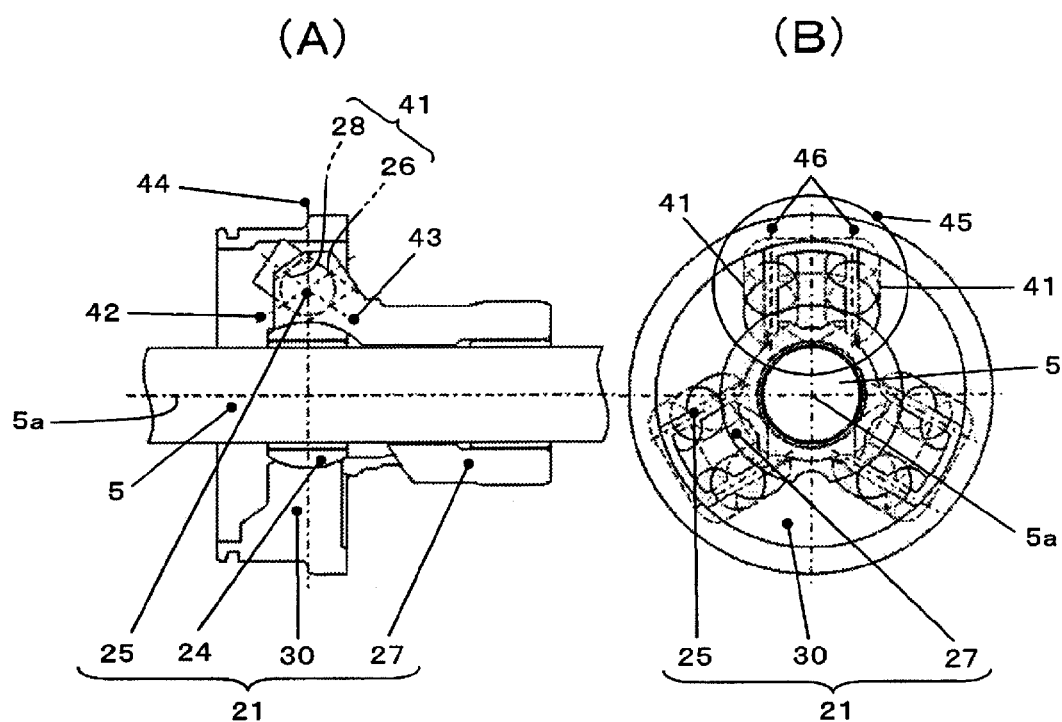
FIG. 4 shows an example of the structure of the wabble plate type variable displacement compressor depicted in FIG. 1.

FIG. 4 shows a condition where the relative angle between the inner and outer rings is zero in rotation preventing mechanism 21 of wabble plate 12. As depicted in FIG. 4(A), guide grooves 26, 28 formed on inner ring 27 and outer ring 24 of rotation preventing mechanism 21 are disposed at relative angles (relative angles within a range of 30 to 60 degrees) relative to the center axis of rotational main shaft 5. Guide groove 26 formed on inner ring 27 (axis 42 of guide groove 26) and guide groove 28 formed on outer ring 30 (axis 43 of guide groove 28), which form one ball guide 41 and oppose each other, are disposed so as to be symmetric relative to plane 44 which is perpendicular to rotational main shaft 5 and passes through the wabble center of wabble plate 12, at a condition where the relative angle between the axis of inner ring 27 and the axis of outer ring 30 is zero. Ball 25 is regulated and supported on the intersection of axis 42 of guide groove 26 and axis 43 of guide groove 28. Further, as depicted in FIG. 4(B), a structure can be employed wherein two ball guides adjacent to each other among a plurality of ball guides 41 of rotation preventing mechanism 21 are referred to be a pair of ball guides, and respective ball guides 41 in the pair of ball guides 45, in other words, axes 46 of the guide grooves formed on the inner and outer rings in this portion, are disposed in parallel to each other. In such a structure, as aforementioned, because the play in the rotational direction in the rotation preventing mechanism portion is schematically decided by a relationship between the distance between the bottoms of the pair of guide grooves provided on the inner and outer rings and the diameter of the balls, setting and management of an actual clearance are facilitated, and it becomes possible to suppress the play to be small by setting a proper clearance. A plurality of balls 25 operating for power transmission are supported in the compression direction between guide grooves 26, 28 facing each other through the respective balls, and perform power transmission. Since ball 25 is held by guide grooves 26, 28 facing each other so as to be embraced and come into contact with both guide grooves 26, 28, the contact area between ball and the respective guide grooves 26, 28 may be ensured to be sufficient large, it becomes possible to reduce the contact surface pressure, and a structure remarkably advantageous in reliability, vibration and silent performance may be realized. Further, it is also possible to make the diameter of balls 25 small, and the whole of the rotation preventing mechanism may be made small.

Figure 5:
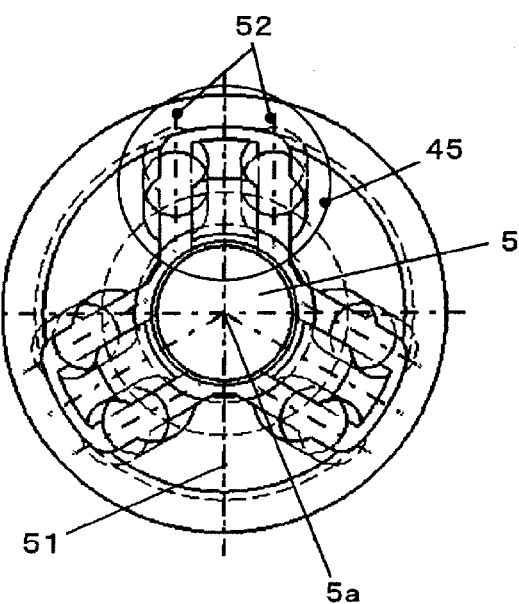
FIG. 5 is a partial elevational view showing another example of the structure of the wabble plate type variable displacement compressor depicted in FIG. 1.

Further, the load applied to ball, which is provided as a moment whose center is rotational main shaft 5, is generated as a perpendicular reaction force of the actual contact surface. The smaller the inclination of the normal line of the contact surface relative to the direction of the moment is, the smaller the contact load becomes, and as depicted in FIG. 5, by a structure where the pair of ball guides 45 disposed in parallel as described above are disposed symmetrically relative to plane 51 including center axis 5a of rotational main shaft 5, in other words, by a structure where axes 52 of two sets of guide grooves formed on the inner and outer rings are disposed symmetrically relative to plane 51 including center axis 5a of rotational main shaft 5, the mechanism is made as a rotational preventing mechanism which does not select the rotational direction and the ball contact load can be minimized.

Figure 6:
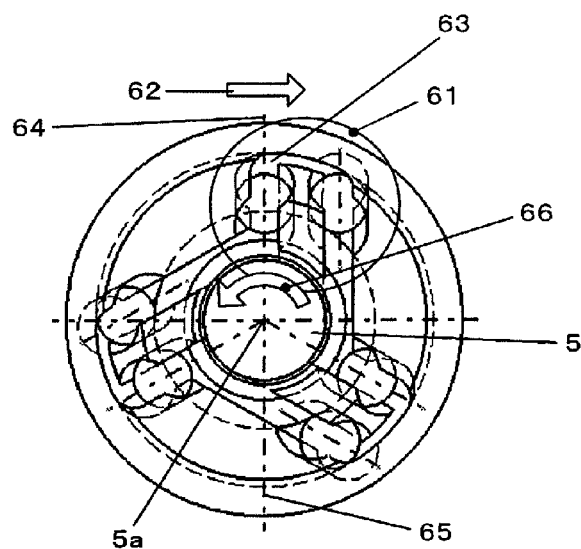
FIG. 6 is a partial elevational view showing a further example of the structure of the wabble plate type variable displacement compressor depicted in FIG. 1.

Further, as depicted in FIG. 6, by offsetting one ball guide 63 mainly operating in power transmission direction of outer ring 62 among the pair of ball guides 61, in other words, axis 64 of the guide groove in the ball guide 63, onto plane 65 including center axis 5a of rotational main shaft 5, it is possible to further reduce the contact load in the specified restricted power transmission direction. Where, arrow 66 indicates power transmission direction of inner ring.

Figure 7:
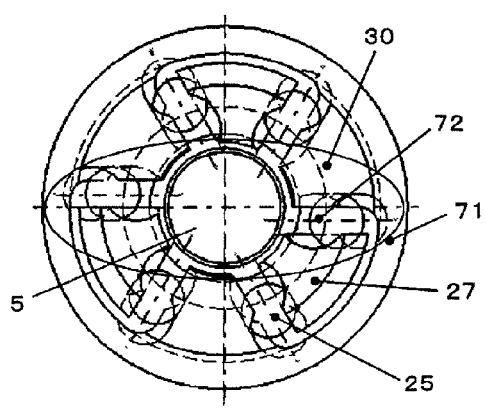
FIG. 7(A) and FIG. 7(B) are partial elevational views showing further examples of the structure of the wabble plate type variable displacement compressor depicted in FIG. 1, and FIG. 7(A) and FIG. 7(B) show examples different from each other.
Figure 7:
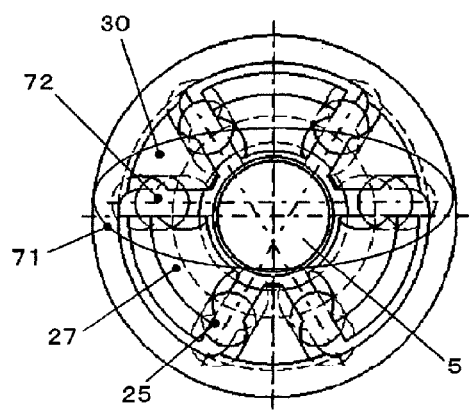

Further, as depicted in FIGS. 7(A) and (B), a structure can also be employed wherein two ball guides disposed on both sides of rotational main shaft 5 approximately symmetrically relative to rotational main shaft 5 among a plurality of ball guides are referred to be a pair of ball guides, and the pair of ball guides are disposed in parallel to each other, in other words, axes 72 of guide grooves formed on inner and outer rings 27, 30 forming the pair of ball guides 71 are disposed in parallel to each other. By this structure, because the play in the rotational direction in the rotation preventing mechanism portion is schematically decided by a relationship between the distance between a set of bottoms of the pair of guide grooves provided on inner and outer rings 27, 30 and the diameter of the balls, it becomes possible to set and manage the clearances in both ball guides simultaneously at desirable clearances, by disposing two ball guides symmetrically disposed in parallel to each other. Consequently, the setting and management of the clearances are facilitated, and it becomes possible to suppress the play to be small.

Figure 8:
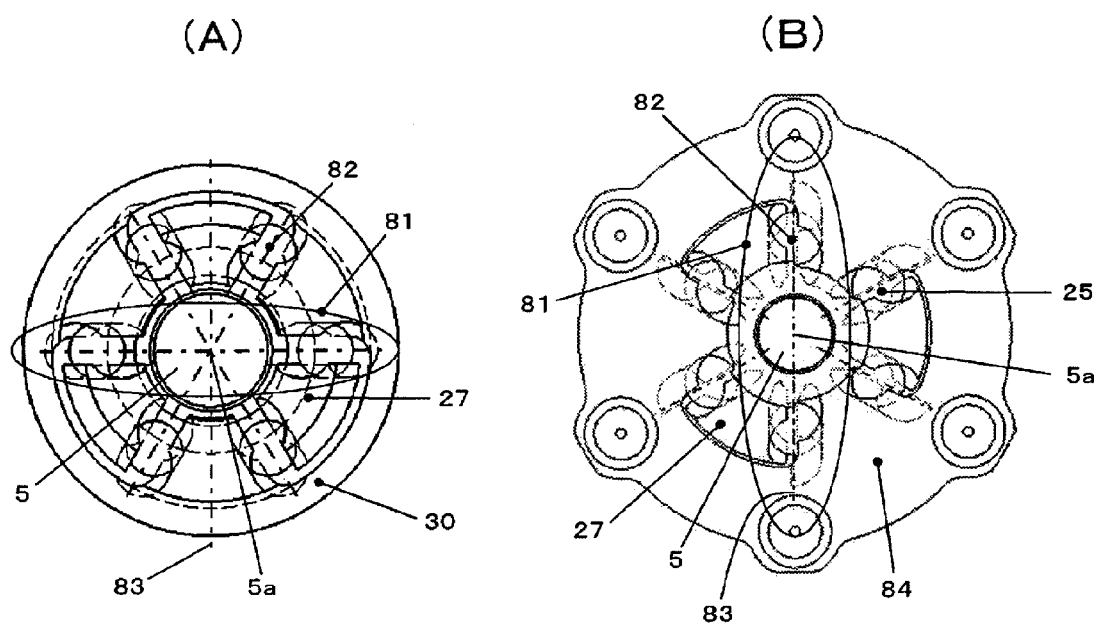
FIG. 8(A) and FIG. 8(B) are partial elevational views showing further examples of the structure of the wabble plate type variable displacement compressor depicted in FIG. 1, and FIG. 8(A) and FIG. 8(B) show examples different from each other.

Further, in this structure where the pair of ball guides are disposed in parallel to each other, as depicted in FIGS. 8(A) and (B), a structure can be employed wherein the pair of ball guides 81, which are disposed in parallel to each other, are disposed so that axes 82 of guide grooves forming the pair of ball guides are positioned on plane 83 including center axis 5a of rotational main shaft 5. In such a structure, the ball contact load is minimized without selecting the power transmission direction. Where, in FIG. 8(B), a structure of a case of wabble plate 84 integrated with an outer ring is exemplified.

Industrial Applications of the Invention

The wabble plate type variable displacement compressor according to the present invention can be applied to a wabble plate type variable displacement compressor used in any field, and especially, it is suitable for use in the field for vehicles highly requiring making small-sized, increase of reliability, improvement of vibration and silent performance, and cost down, in particular, for use in an air conditioning system for vehicles.

The invention claimed is:

1. A wabble plate type variable displacement compressor having a wabble plate which is connected to a piston inserted reciprocally into a cylinder bore, in which a rotational movement of a swash plate rotated together with a rotational main shaft and supported changeably in angle relative to said main shaft is converted into a wabble movement of said wabble plate, and which transmits said wabble movement to said piston to reciprocate said piston, characterized in that a rotation preventing mechanism of said wabble plate comprises (a) an inner ring provided in a housing movably in an axial direction although rotation is prevented, supporting said rotational main shaft via a bearing at an inner diameter portion to rotate relatively and to move relatively in an axial direction and having a plurality of guide grooves for guiding a plurality of balls provided for power transmission, (b) a sleeve functioning as a wabble central member of said wabble movement of said wabble plate, provided on said rotational main shaft to rotate relatively thereto and to move in an axial direction and engaged with said inner ring movably in an axial direction together with said inner ring, (c) an outer ring having a plurality of guide grooves for guiding said balls at positions opposing respective guide grooves of said inner ring, supported on said sleeve wabblingly, supporting said wabble plate fixedly on an outer circumference and supporting said swash plate rotatably via a bearing, and (d) a plurality of balls held by said guide grooves formed in said inner ring and said outer ring at a condition of opposing each other and performing power transmission by being compressed between said guide grooves.

2. The wabble plate type variable displacement compressor according to claim 1, wherein said outer ring is formed integrally with said wabble plate.

3. The wabble plate type variable displacement compressor according to claim 1, wherein said guide grooves opposing each other of said inner ring and said outer ring of said rotation preventing mechanism are formed at a relative angle of 30 to 60 degrees relative to a center axis of said rotational main shaft, and guide grooves opposing each other for forming a single ball guide are disposed so as to be symmetric relative to a plane perpendicular to said main shaft and passing through a wabble center of said wabble plate at a condition where a relative angle between an axis of said inner ring and an axis of said outer ring is zero.

4. The wabble plate type variable displacement compressor according to claim 3, wherein two ball guides adjacent to each other among a plurality of ball guides of said rotation preventing mechanism are referred to be a pair of ball guides, and said pair of ball guides are disposed in parallel to each other.

5. The wabble plate type variable displacement compressor according to claim 4, wherein said pair of ball guides disposed in parallel to each other are disposed symmetrically relative to a plane including a center axis of said rotational main shaft.

6. The wabble plate type variable displacement compressor according to claim 4, wherein a guide groove forming one ball guide of said pair of ball guides, which are disposed in parallel to each other, is disposed so that its axis is positioned on a plane including a center axis of said rotational main shaft.

7. The wabble plate type variable displacement compressor according to claim 3, wherein two ball guides disposed on both sides of said rotational main shaft approximately symmetrically relative to said rotational main shaft among a plurality of ball guides of said rotation preventing mechanism are referred to be a pair of ball guides, and said pair of ball guides are disposed in parallel to each other.

8. The wabble plate type variable displacement compressor according to claim 7, wherein said pair of ball guides, which are disposed in parallel to each other, are disposed so that axes of guide grooves forming said pair of ball guides are positioned on a plane including a center axis of said rotational main shaft.

9. The wabble plate type variable displacement compressor according to claim 1, wherein said compressor is used in an air conditioning system for vehicles.

* * * * *